(12) United States Patent
Shah et al.

(10) Patent No.: US 9,237,549 B1
(45) Date of Patent: Jan. 12, 2016

(54) DYNAMIC MANAGEMENT OF PAGE-RESPONSE INTERVAL IN A WIRELESS COMMUNICATION SYSTEM

(71) Applicant: Sprint Spectrum L.P., Overland Park, KS (US)

(72) Inventors: Maulik K. Shah, Overland Park, KS (US); Siddharth S. Oroskar, Overland Park, KS (US); Jasinder P. Singh, Olathe, KS (US); Anoop K. Goyal, Overland Park, KS (US); Suryanarayanan Ramamurthy, Olathe, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 113 days.

(21) Appl. No.: 13/686,577

(22) Filed: Nov. 27, 2012

(51) Int. Cl.
*H04W 68/02* (2009.01)

(52) U.S. Cl.
CPC ..................................... *H04W 68/02* (2013.01)

(58) Field of Classification Search
CPC ....... H04W 8/26; H04W 48/00; H04W 48/18; H04W 68/00; H04W 68/02; H04W 68/12; H04W 88/02; H04W 88/06
USPC ................. 455/458, 426.1, 515, 550.1–553.1
See application file for complete search history.

(56) References Cited

U.S. PATENT DOCUMENTS

| | | | |
|---|---|---|---|
| 5,726,640 A | 3/1998 | Jones et al. | |
| 7,149,535 B1 | 12/2006 | Chaturvedi et al. | |
| 2001/0023184 A1* | 9/2001 | Kalveram et al. | 455/426 |
| 2004/0102199 A1* | 5/2004 | Haumont | H04W 68/12 455/458 |
| 2008/0132231 A1* | 6/2008 | Balasubramanian | H04W 68/12 455/435.1 |
| 2009/0268897 A1* | 10/2009 | Coppage | 379/221.01 |
| 2009/0275368 A1 | 11/2009 | Wang et al. | |
| 2010/0054166 A1* | 3/2010 | Jung | 370/311 |
| 2010/0317378 A1* | 12/2010 | Fang et al. | 455/466 |
| 2011/0013623 A1* | 1/2011 | Hu et al. | 370/355 |
| 2011/0122862 A1* | 5/2011 | Yun et al. | 370/352 |
| 2012/0264473 A1* | 10/2012 | Mujtaba et al. | 455/515 |
| 2013/0102313 A1* | 4/2013 | Tinnakornsrisuphap et al. | 455/436 |

* cited by examiner

*Primary Examiner* — Michael Mapa (57) ABSTRACT

A method and apparatus for managing page-response intervals. When a network entity receives a paging trigger signal, the entity determines a page-response interval to use for paging the mobile station, based on one or more factors such as (i) whether the communication is to be provided to the mobile station over the same air interface and/or same air interface protocol that will carry the paging to the mobile station and/or (ii) what network, interface, or other entity the trigger signal comes from and/or what network communication module receives the trigger signal. The network entity then uses the determined page-response interval when paging the mobile station, waiting that determined period of time after each page attempt before attempting to page again or before concluding that the paging effort failed.

23 Claims, 5 Drawing Sheets

DYNAMIC MANAGEMENT OF PAGE-RESPONSE INTERVAL IN A WIRELESS COMMUNICATION SYSTEM

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which mobile stations such as cell phones, tablet computers, tracking devices, embedded wireless modules, and other wirelessly equipped communication devices, can operate. In turn, each base station may be coupled with equipment that provides connectivity with one or more transport networks, such as the public switched telephone network (PSTN) and/or the Internet for instance. With this arrangement, a mobile station operating in coverage of the network may engage in air interface communication with a base station and may thereby communicate via the base station with various remote network entities or with other mobile stations served by the base station.

In general, a cellular wireless system may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Code Division Multiple Access (CDMA) (e.g., 1xRTT and 1xEV-DO), Long Term Evolution (LTE), WiMAX, iDEN, TDMA, AMPS, Global System for Mobile Communications (GSM), GPRS, UMTS, EDGE, MMDS, WI-FI, and BLUETOOTH. Each protocol may define its own procedures for initiation of calls, handoff between coverage areas, and functions related to air interface communication.

In accordance with the air interface protocol, each coverage area may operate on one or more carrier frequencies and may define a number of air interface channels for carrying information between the base station and served mobile stations. These channels may be defined in various ways, such as through frequency division multiplexing, time division multiplexing, and/or code-division multiplexing for instance.

By way of example, each coverage area may define a reference channel or other resource on which the base station may broadcast a reference signal that mobile stations may measure to evaluate coverage strength. As another example, each coverage area may define an uplink control channel or other resource on which mobile stations may transmit control messages such as registration requests and access requests to the base station. And each coverage area may define a downlink control channel or other resource on which the base station may transmit control messages such as system information messages and page messages to mobile stations. Each coverage area may then define one or more traffic channels or other resource for carrying communication traffic such as voice data and other data between the base station and mobile stations.

When a mobile station first powers on or enters into coverage of the network, the mobile station may detect presence of coverage and may register with the network by transmitting a registration request or attach request to a base station. At that point, the mobile station may operate in an idle mode in which the mobile station periodically reads a downlink control channel to receive overhead information from the network and to check for any page messages destined to the mobile station. In the idle mode, the mobile station may have no assigned traffic channel resources on which to receive incoming communication traffic from the network.

When the network has a communication such a voice call or other traffic to provide to a mobile station that is registered with the network but is operating in the idle mode, the network may page the mobile station in an effort to then facilitate assigning traffic channel resources to the mobile station. In particular, the network may transmit on the downlink a page message addressed to the mobile station. Assuming the mobile station receives this page message, the mobile station may then transmit to the network a page response message on the uplink. And upon receipt of the page response message, the network may then assign traffic channel resources to the mobile station, for use to carry the communication.

Once a network transmits a page message to a mobile station, the network may wait a defined period of time for the mobile station to respond. If the mobile station does not respond to the page message within that period of time, the network may then re-page the mobile station, possibly increasing page message transmission power and/or broadening the coverage area scope of the page. Further, the network may repeat this re-paging process a defined number of times before concluding that the paging effort failed. Upon concluding that the paging effort failed, the network may then abort the effort to provide the communication to the mobile station. For an incoming voice call, this may mean that the call may instead be connected to voice mail. For other communication traffic, this may mean that the network may discard or otherwise handle the communication. Other examples are possible as well.

Overview

In practice, the time interval that a network waits for response after each page attempt may vary from network to network, and therefore the process of working to set up delivery of a communication to a mobile station may be quicker in some networks than in others.

Considering 4G LTE networks and 3G CDMA networks for instance, 4G LTE networks may use a shorter page-response interval than 3G CDMA networks and may thus work more quickly to set up delivery of a communication to a mobile station. By way of example, a CDMA network may be set to wait a period of 5 seconds after each attempt to page a mobile station before then re-paging the mobile station or concluding that the paging effort failed. Consequently, if the CDMA network is set to make three attempts to page a mobile station before concluding that the paging effort failed, the total wait period before reaching that conclusion would be about 15 seconds. On the other hand, an LTE network may be set to wait a period of just 2 seconds after each attempt to page a mobile station before then re-paging the mobile station or concluding that the paging effort failed. Consequently, if the LTE network is likewise set to make three attempts to page a mobile station before concluding that the paging effort failed, the total wait time before reaching that conclusion would be just about 6 seconds.

This disparity in page-response intervals can pose an issue, however, in a system where a mobile station can be paged through various different networks for a given type of incoming communication. In particular, the process of setting up that type of communication may be noticeably quicker when the setup occurs through one network than when the setup occurs through another network. And this difference in setup speeds may pose an issue in terms of user experience.

A particular example of this may occur with a mobile station that is equipped to receive and engage in voice calls over CDMA but that is also equipped to idle on and engage in data communication over LTE and to receive page messages for CDMA voice calls over the LTE network.

When such a mobile station is registered with and idling in coverage of a CDMA network, if the CDMA network receives an incoming call for the mobile station, the CDMA network may page the mobile station over a CDMA air interface and use a page-response interval particular to the CDMA network, such as the 5 second interval described above for instance. During this call setup process, the calling party may conventionally hear a ringback tone, which would continue at least until the network concludes that the paging effort failed and connects the call to voice mail. Thus, with the example above, the calling party may hear about 15 seconds of ringback tone before the call then gets connected to voice mail.

On the other hand, when such a mobile station is registered with and idling in coverage of an LTE network, if an associated CDMA network receives an incoming call for the mobile station, the CDMA network may signal to the LTE network to cause the LTE network to page the mobile station over LTE for the call to be connected over CDMA. In that case, the LTE network would page the mobile station over an LTE air interface, using a page-response interval particular to the LTE network, such as the 2 second interval described above for instance. If the mobile station responds to this page message, signaling may then pass back from the LTE network to the CDMA network, the CDMA network may assign traffic channel resources for the call, and the mobile station may then move over to CDMA coverage to take the call on the CDMA traffic channel. However, if the mobile station does not respond to the page message, the call may again ultimately be connected to voice mail. Yet in this case, since the LTE page-response interval is shorter than the CDMA page-response interval, the calling party may hear ringback for a potentially far shorter period, perhaps on the order of just 6 seconds before the call gets connected to voice mail.

From the perspective of the calling party, this difference in call setup time may appear inconsistent and awkward. At times, the calling party may call the mobile station and hear ringing for a particular period of time before the call goes to voice mail, and at other times, the calling party may call the same mobile station and hear ringing for a potentially much shorter period of time before the call goes to voice mail.

One solution to this problem is to change the LTE network and/or CDMA network so that they both apply the same page-response interval for all paging. However, there is likely good engineering reason as a basic matter to have a shorter page-response interval in the LTE network than in the CDMA network. Consequently, an improved solution is desired.

Disclosed herein are methods and apparatuses for dynamically managing page-response intervals. As disclosed, when a network entity receives a signal that triggers the entity to page a mobile station for a communication to be provided to the mobile station, the entity may determine a page-response interval to use for paging the mobile station, based on one or more factors such as (i) whether the communication is to be provided to the mobile station over the same air interface and/or same air interface protocol that will carry the paging to the mobile station, or rather over a different air interface and/or different air interface protocol, and/or (ii) what network, interface, or other entity the trigger signal comes from and/or what network communication module receives the trigger signal, which may indicate whether the communication will be delivered to the mobile station over the same air interface that will carry the paging to the mobile station, or rather over another air interface. The network entity may then use that determined page-response interval when paging the mobile station, namely, waiting that determined period of time after each page attempt before attempting again or concluding that the paging effort failed.

In one respect, for instance, disclosed is a method for managing page-response intervals. The method includes receiving into a network entity a signal that triggers paging of a mobile station over a first air interface, wherein the paging is for a communication that is either (i) to be provided to the mobile station over the first air interface or (ii) to be provided to the mobile station over a second air interface other than the first air interface. The method then involves, responsive to receiving the signal, the network entity paging the mobile station over the first air interface. Further, the method involves the network entity determining, based on the type of the communication, a page-response interval to use for re-paging the mobile station. And the method involves the network entity waiting until expiration of the determined page-response interval after the paging of the mobile station, and, upon the expiration of the selected page-response interval, re-paging the mobile station.

In another respect, disclosed is an apparatus configured to dynamically manage page-response intervals. The apparatus includes at least one network communication module for receiving signals that trigger paging of mobile stations and for outputting page messages for transmission over a first air interface protocol to mobile stations. Further, the apparatus includes a controller, wherein the controller is configured such that when the controller receives via the at least one network communication module a signal that triggers paging of a mobile station over the first air interface protocol, (i) the controller pages the mobile station by causing the at least one network communication module to output a page message for transmission over the first air interface protocol to the mobile station, (ii) the controller then waits for expiration of a page-response interval, and (iii) upon expiration of the page-response interval without receiving a page response from the mobile station, the controller re-pages the mobile station by causing the at least one network communication module to output the page message again for transmission over the first air interface protocol to the mobile station. And still further, the controller is configured to determine the page-response interval to wait, based at least in part on whether the paging is for (i) a communication to be provided to the mobile station over the first air interface protocol or rather (ii) a communication to be provided to the mobile station over an air interface protocol other than the first air interface protocol.

In yet another respect, disclosed is a non-transitory machine readable medium having stored thereon instructions executable by a processing unit to carry out various functions so as to dynamically manage page-response intervals. By way of example, the functions may include selecting a page-response time interval to use for paging a mobile station over a first air interface protocol, wherein the selecting comprises (i) selecting a first page-response time interval if the paging is for a communication to be provided to the mobile station over the first air interface protocol and (ii) selecting a second page-response time interval different than the first page-response time interval if the paging is for a communication to be provided to the mobile station over an air interface protocol other than the first air interface protocol. Further, the functions may include using the selected page-response time interval in paging the mobile station, to determine when to re-page the mobile station.

And in still another respect, disclosed is a paging control apparatus for managing paging of mobile stations. The apparatus includes at least one network communication module for receiving signals that trigger paging of mobile stations and for outputting page messages for wireless transmission to mobile stations. Further, the apparatus includes a controller, wherein the controller is configured such that when the controller receives via the at least one network communication module a signal that triggers paging of a mobile station, (i) the controller pages the mobile station by causing the at least one network communication module to output a page message for wireless transmission to the mobile station, (ii) the controller then waits for expiration of a page-response interval, and (iii) upon expiration of the page-response interval without receiving a page response from the mobile station, the controller re-pages the mobile station by causing the at least one network communication module to output the page message again for wireless transmission to the mobile station. Moreover, the controller is configured to select the page-response interval to wait, based at least in part on an interface over which the controller receives the signal. In particular, if the controller receives the signal over a first interface, the controller selects a first page-response interval, and if the controller receives the signal over a second interface different than the first interface, the controller selects a second page-response interval different than the first page-response interval.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

As noted above, FIG. 1 is a simplified block diagram of a network arrangement in which an exemplary embodiment of the present method and apparatus can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

Figure 1:
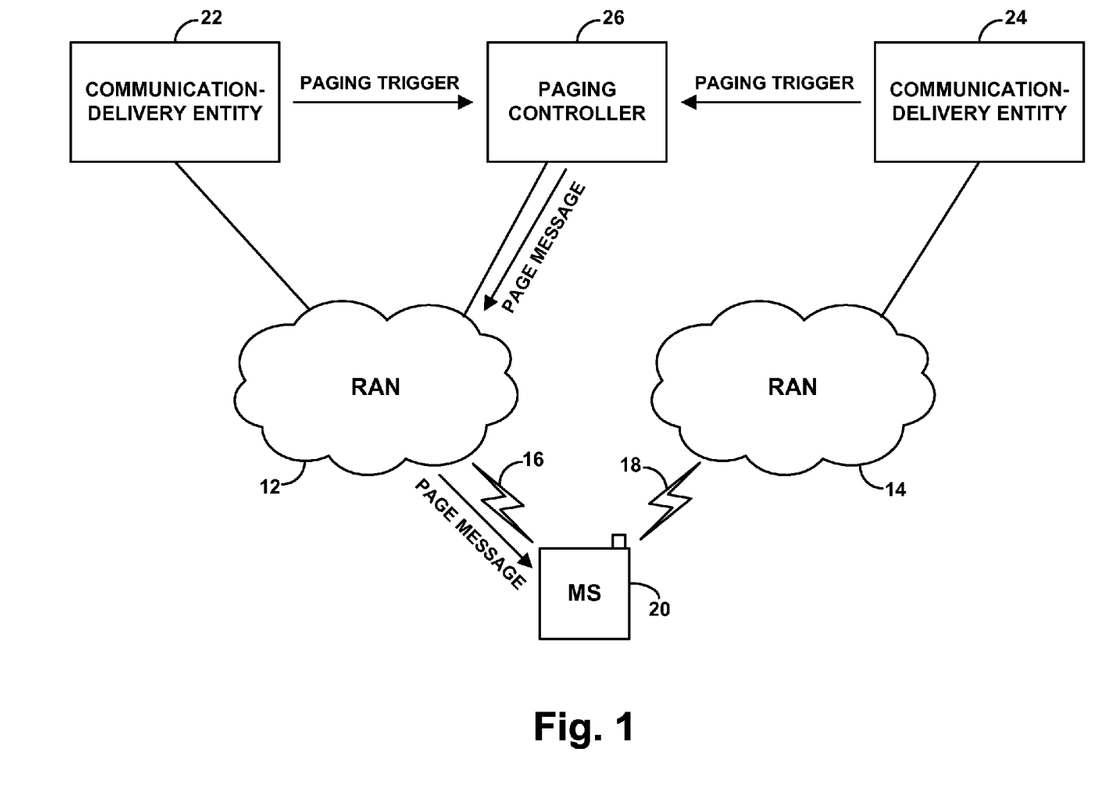
FIG. 1 is a simplified block diagram of a network arrangement in which an exemplary embodiment of the present method and apparatus can be implemented.

The arrangement of FIG. 1 includes by way of example two representative radio access networks (RANs) 12, 14, each of which may function to provide mobile stations with air interface coverage and connectivity with one or more transport networks such as the PSTN and the Internet. As shown in the figure, RAN 12 radiates to provide a respective coverage area defining an air interface 16 through which to exchange control and bearer data with mobile stations, and RAN 14 radiates to provide a respective coverage area defining an air interface 18 through which to exchange control and bearer data with mobile stations. The figure then illustrates a representative mobile station 20 positioned such that it may engage in air interface communication with either or both of the RANs.

As further shown, the network arrangement includes two representative communication-delivery entities arranged to deliver communications to mobile stations served by the RANs. In particular, one communication-delivery entity 22 is arranged to deliver communications to mobile stations served by RAN 12, and another communication-delivery entity 24 is arranged to deliver communications to mobile stations served by RAN 14. That is, communications from entity 22 may pass to mobile stations over air interface 16 provided by RAN 12, and communications from entity 23 may pass to mobile stations over air interface 18 provided by RAN 14.

These communication-delivery entities may take any of a variety of forms, examples of which include servers, multi-server platforms, or networks. Likewise, the communications that they may provide to mobile stations may take various forms, examples of which include packet-data communication, voice calls, provisioning messages, and/or text messages. Although these entities are shown outside of the RANs 12, 14, either or both could instead be part of either or both RANs.

As still further shown, the network arrangement includes a paging controller 26, which is arranged to page mobile stations over air interface 16 of RAN 12 so as to facilitate providing of communications from entities 20, 22 (or the like) to those mobile stations.

In practice, for instance, when mobile station 18 is registered with and idling in coverage of RAN 12, paging controller 26 may receive a paging trigger signal directly or indirectly from or on behalf of communication-delivery entity 22, indicating that the communication-delivery entity 22 has a communication to provide to mobile station 20. In response, the paging controller 26 may then page mobile station 20 via RAN 12 and thus over air interface 16. In line with the description above, for example, the paging controller 26 may make multiple attempts to page the mobile station, waiting a page-response interval after each attempt, before ultimately concluding that the paging failed. If the mobile station responds to the paging, RAN 12 may assign traffic channel resources to the mobile station, and the paging controller 26 may then signal back to the communication-delivery entity 22. The communication-delivery entity 22 may then provide (e.g., transmit, connect, or otherwise deliver) the communication to the mobile station via RAN 12 and thus over air interface 16.

Likewise, when mobile station 20 is registered with and idling in coverage of RAN 12, the paging controller 26 may receive a paging trigger signal directly or indirectly from or on behalf of communication-delivery entity 24, indicating that communication-delivery entity 24 has a communication to provide to the mobile station via RAN 14. In response, the paging controller may then page the mobile station via RAN 12 and thus over air interface 16, again with a process such as that described above, waiting a page-response interval after each attempt. In this case, though, if the mobile station responds to the paging, paging controller 26 may signal back to the communication-delivery entity 24, and RAN 14 may assign traffic channel resources to the mobile station. The mobile station may then transition to be served by RAN 12 instead, and the communication entity 24 may then provide the communication to the mobile station via RAN 14 and thus over air interface 18.

Paging controller 26 may take any of a variety forms. By way of example, the paging controller may be a server or other stand-alone network apparatus configured to carry out various functions related to control and setup of communications, including but not limited to paging. Alternatively, the paging controller could be integrated with various other network entities, such as a functional component of an apparatus that serves one or more other functions. As such, like the communication-delivery entities 22, 24, the paging controller could be provided as part of either or both RANs. For instance, the paging controller could be provided as part of a base station or other RAN equipment.

With the arrangement shown in FIG. 1, the paging controller 26 may be configured in accordance with the present disclosure to dynamically manage page-response intervals. For example, the paging controller 26 may be arranged to select a page-response interval to apply in a given instance based on whether the paging is for a communication that is to be provided to the mobile station over the same air interface that will carry the paging or is rather for a communication that is to be provided to the mobile station over a different air interface.

For instance, given that the paging controller 26 will page the mobile station over air interface 16 of RAN 12, the paging controller could select a page response interval based on whether the paging is for a communication to be provided to the mobile station over that same air interface, i.e., also via RAN 12. If the paging is for a communication to be provided to the mobile station over that same air interface (namely air interface 16 of RAN 12), then the paging controller 26 may select and use a particular page-response interval. Whereas, if the paging is for a communication to be provided to the mobile station over a different air interface (e.g., air interface 18 of RAN 14), then the paging controller 26 may select and use a different page-response interval, such as a longer page-response interval.

In practice, the paging controller may carry out this analysis and selection of a page-response interval by considering various factors. Alternatively, the paging controller may determine what page-response interval to use by being instructed by another entity what page-response interval to use, where the ultimate determination was made based on factors such as those described herein.

For example, the paging controller could select a page-response interval based on which communication-delivery entity the paging trigger came from. If the paging trigger came from communication-delivery entity 22, for instance, it may follow that the paging is for a communication is to be provided to the mobile station over air interface 16 of RAN 12—the same air interface over which the paging will be provided, and so the paging controller may select a particular page-response interval. Whereas, if the paging trigger came from communication-delivery entity 24, for instance, it may follow that the paging is for a communication is to be provided to the mobile station over air interface 18 of RAN 14, and so the paging controller may select a particular page-response interval.

As another example, the paging controller could select a page-response interval based on which interface (e.g., which logical or physical network link) carried the paging trigger to the paging controller. For instance, the paging controller could select one page-response interval if the paging trigger came to the paging controller over an interface that typically carries signaling related to communications to be delivered by communication-delivery entity 22 (and thus to be delivered over air interface 16 of RAN 12). And the paging controller could select a different page-response interval if the paging trigger came to the paging controller over an interface that typically carries signaling related to communications to be delivered by communication-delivery entity 24 (and thus to be delivered over air interface 18 of RAN 14).

Likewise, the paging controller could select a page-response interval based on which of various network communication modules of the paging controller receives the paging trigger. For instance, the paging controller could select one page-response interval if the paging trigger was received by a network communication module of the paging controller that typically receives signaling related to communications to be delivered by communication-delivery entity 22. And the paging controller could select a different page-response interval if the paging trigger was received by a network communication module of the paging controller that typically receives signaling related to communications to be delivered by communication-delivery entity 24.

In a scenario where communication-delivery entity 22 and communication-delivery entity 24 are arranged to deliver communications to mobile stations over respectively different air interfaces, these mechanisms for selecting a page-response interval could be considered proxies for selecting a page-response interval based on which air interface will carry the communication to the mobile station. Further, in a scenario where communication-delivery entity 22 and communication-delivery entity 24 are arranged to deliver communications to mobile stations over respectively different air interface protocols (e.g., LTE or CDMA), these mechanisms for selecting a page-response interval could be considered proxies for selecting a page-response interval based on which air interface protocol will carry the communication to the mobile station. Alternatively, if the paging controller has data that indicates which air interface and/or which air interface protocol will be used to deliver the communication (e.g., as a parameter provided with the paging trigger or associated with the paging trigger), the paging controller could expressly select the page-response interval based on the air interface and/or air interface protocol indicated by that data.

Figure 2:
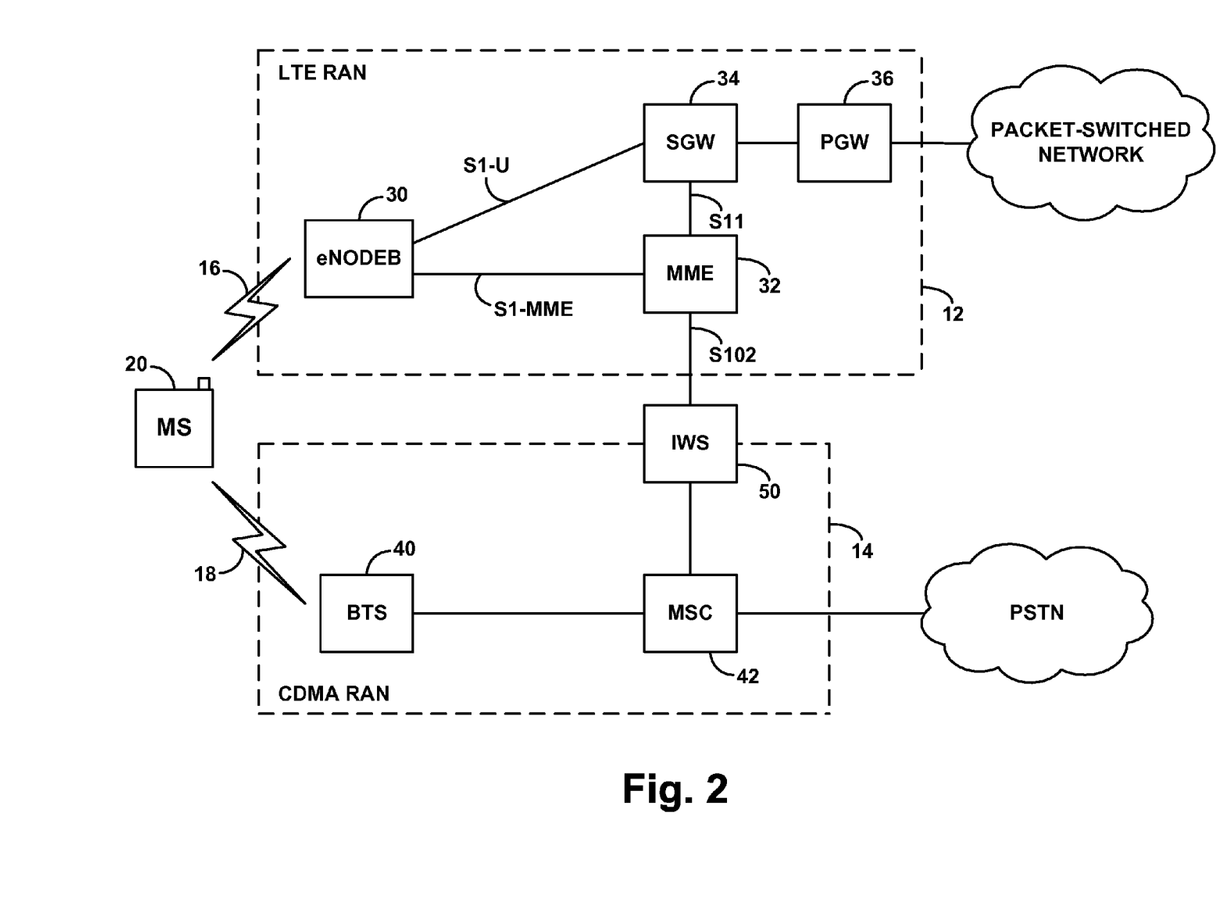
FIG. 2 is a simplified block diagram of a more specific network arrangement in which the exemplary embodiment can be implemented.

FIG. 2 is next a more specific block diagram depicting an example network arrangement like that shown in FIG. 1. In the arrangement of FIG. 2, RAN 12 is an 4G LTE network that primarily serves mobile stations with wireless packet data communication service (including perhaps voice-over-packet and other packet-based real-time media service), and RAN 14 is a 3G CDMA network that primarily serves mobile stations with circuit-switched voice call service (but may also provide packet-data communication service and other types of service). These networks could take other forms as well, using other protocols such as WiMAX, GSM, or others now known or later developed.

The 4G LTE network 12 in this arrangement is shown including a representative LTE base station 30 known as an eNodeB, which includes an antenna structure and associated equipment for engaging in LTE communication over air interface 16 with mobile stations. And the paging controller 26 is shown as an LTE mobility management entity (MME) 32, which functions to manage paging over the LTE air interface and as a signaling controller to facilitate setup of backhaul bearer paths through which data can be communicated to and from served mobile stations. (Alternatively, in a scenario where the eNodeB would control the process of paging, waiting the page-response interval, and re-paging, the eNodeB could be considered to be the paging controller 26.) Communication-delivery entity 22 in this arrangement is then shown as an LTE serving-gateway (SGW) 34, which may be in communication with a packet-gateway (PGW) 36 that connects with private or public packet-switched network (not shown).

As shown, the interface (physical or logical network connection) between the MME 32 and the SGW is known as an S11 interface, the interface between the MME 32 and the eNodeB 30 is known as an S1-MME interface, and the interface between the SGW 34 and the eNodeB 30 is known as an S1-U interface.

In this LTE network arrangement, when mobile station 20 is registered with and idling in coverage of the eNodeB 30, if SGW 34 receives packet data to be delivered to the mobile station, the SGW may send a paging trigger signal via the S11 interface to the MME 32. In response, MME 32 may then page the mobile station 20 via the eNodeB 30, applying a process such as that described above. Namely, the MME may send a paging message to the eNodeB, which the eNodeB may then transmit over the air to the mobile station (e.g., in a next time slot that the mobile station may be arranged to monitor for paging). The MME may then wait a defined page-response interval and, absent receipt of a response from the mobile station, may then send the page message again.

After a defined number of attempts (e.g., three attempts) with no response, the MME may then conclude that the paging failed and may signal back to the SGW, which may discard the data or take other action. Alternatively, if the MME receives a response from the mobile station, the MME may then engage in signaling with the SGW and eNodeB to set up a bearer connection through which the SGW may then transmit the packet data to the eNodeB, and the eNodeB may assign air interface traffic channel resources and may transmit the packet-data over the air interface 16 to the mobile station.

The 3G network 14, on the other hand, is shown including a representative CDMA base station 40 known as a base transceiver station (BTS), which includes an antenna structure and associated equipment for engaging in CDMA communication over air interface 18 with mobile stations. And a paging controller of the CDMA network is shown as a mobile switching center (MSC) 42, which functions to manage paging over the CDMA air interface and to provide connectivity with the PSTN. (Alternatively, in a scenario where the BTS would control the process of paging, waiting the page-response interval, and re-paging, the BTS could be considered to be the paging controller of the CDMA network.) Communication-delivery entity 24 in this arrangement may then be considered to be RAN 14 as a whole, MSC 42 or BTS 40 in particular, or another entity associated with RAN 14 and with delivery of communications via air interface 18 to mobile stations.

In this CDMA network arrangement, if mobile station 20 is registered with and idling in coverage of BTS 40, and if MSC 42 receives a signal indicative of an incoming voice call to be connected to the mobile station, the MSC may then page the mobile station via BTS 40, applying a process such as that described above. Namely, the MSC may send a paging message to the BTS (e.g., via a base station controller (BSC) (not shown)), which the BTS may then transmit over air interface 18 to the mobile station (e.g., in a next time slot that the mobile station may be arranged to monitor for paging). The MSC may then wait a defined page-response interval and, absent receipt of a response from the mobile station, may then send the page message again.

After a defined number of attempts (e.g., three attempts) with no response, the MSC may then conclude that the paging failed and may responsively connect the incoming call to a voice mail system (not shown). Alternatively, if the MSC receives a response from the mobile station, the MSC may then arrange for the BTS to assign traffic channel resources to the mobile station, and the MSC may connect the call via the BTS and the air interface to the mobile station.

Further shown in FIG. 2 is an interworking server (IWS) 50, which functions to facilitate interworking between the LTE network 12 and the CDMA network 14, so as to enable a mobile station operating in LTE coverage to be paged over LTE for calls to be connected over CDMA. The IWS 50 is shown communicatively linked with the MME 32 by an interface (physical or logical network connection) known as an S102 interface.

In this "circuit-switched fallback" arrangement, the mobile station would be registered with and idling in coverage of the LTE network but also registered with the CDMA network. When the CDMA network has an incoming call to be connected to the mobile station, the MSC 42 may then provide a paging trigger signal to the IWS 50, which may in turn provide the paging trigger signal via the S102 interface to the MME 32. Upon receipt of this paging trigger signal, the MME may then page the mobile station 20 via the eNodeB 30, applying the LTE paging process described above, waiting the page-response interval after each page attempt.

However, in this case, if the paging fails (e.g., the mobile station does not respond after a defined number of attempts), the MME may then signal accordingly back to the IWS, the IWS may signal accordingly back to the MSC, and the MSC may then connect the incoming call to voice mail. On the other hand, if the mobile station responds to the page, the MME may then signal accordingly back to the IWS, the IWS may signal back to the MSC, to facilitate set up of the call via the CDMA network. In one such arrangement, the CDMA network may then transmit a traffic channel assignment message via the IWS and LTE network to the mobile station, and the mobile station may then transition over to take the call via air interface 18 using the assigned traffic channel resources. Alternatively, in another such arrangement, the LTE network may direct the mobile station to scan for and acquire connectivity with the CDMA network, and the CDMA network may then transmit a traffic channel assignment message via air interface 18 to the mobile station, so that the mobile station can then take the call via air interface 18.

With this combined LTE/CDMA network arrangement, MME 32 thus functions as paging controller 26 for paging over LTE air interface 16 both for data that SGW 34 would deliver to mobile stations over LTE air interface 16 and for voice calls that the CDMA network 14 would deliver to mobile stations over air interface 18. Assuming that there is good engineering reason to have the MME 32 apply a default LTE page-response interval when paging for data to be delivered by SGW 34, an issue could arise if that page-response interval is noticeably shorter than the default page-response interval that the CDMA network 14 itself uses for paging mobile stations over air interface 18.

The present method can be applied in that scenario to help overcome that issue, by having the MME select a page-response interval to use based on factors such as those described above. In practice, the MME may then select a default LTE page-response interval if the paging via air interface 16 is for data to be delivered by SGW 34 via air interface 16, and the MME may instead select a longer page-response interval (e.g., the same used by default in the CDMA network) if the paging via air interface 16 is for a voice call to be delivered by the CDMA network via air interface 18.

In practice, for instance, the MME may be arranged to select and use one page-response interval when paging over LTE air interface 16 for data to be delivered by SGW 34 over LTE air interface 16 but to use a different page-response interval when paging over LTE air interface 16 for a voice call to be connected by CDMA network 14 over CDMA air interface 18. And in particular, the MME may be arranged to make that selection of page-response interval based on the interface over which the paging trigger signal arrived, such as whether it arrived over the S11 interface from the SGW or rather over the S102 interface from the IWS 50. Further, the MME may be arranged to make the selection based on which network communication module of the MME received the paging trigger signal, such as whether the signal was received by a network communication module that typically receives such signals from SGW 34 or rather was received by a network communication module that typically receives such signals from IWS 50. Other examples are possible as well.

Figure 3:
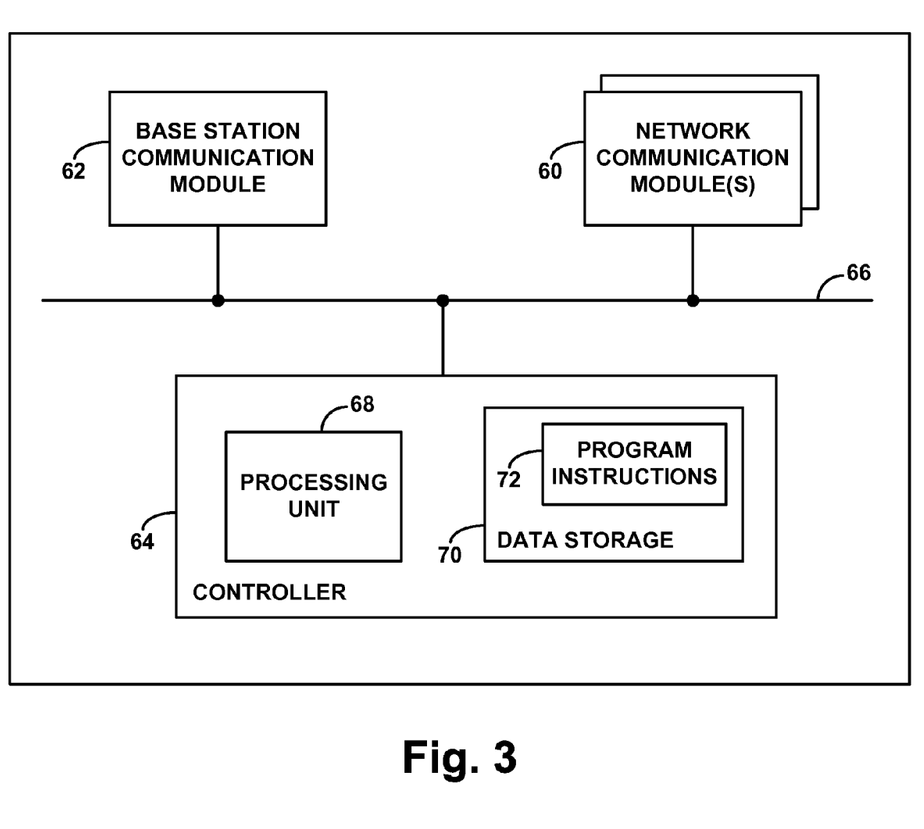
FIG. 3 is a simplified block diagram of an example paging controller apparatus

FIG. 3 is next a simplified block diagram of an apparatus, such as paging controller 26, arranged to carry out the present method. As shown, the example apparatus includes one or more network communication modules 60, a base station communication module 62, and a controller 64, all of which may be communicatively linked together by a system bus, network, or other connection mechanism 66.

The one or more network communication modules 60 may comprise network interface circuits through which the paging controller may engage in signaling communication such as to receive paging trigger signals as discussed above. In the arrangement of FIG. 2, for instance, one such module may be arranged to communicate over the S11 interface with the SGW, whereas another such module may be arranged to communicate over the S102 interface with the IWS. Alternatively, a single network communication module and/or modules distinguished by ports or the like, could be provided for communicating over a packet-switched network on each of these or other interfaces.

Base station communication module 62 may then comprise a network interface circuit through which the paging controller may engage in signaling communication with one or more base stations, such as to transmit page messages and receive page response messages. In the arrangement of FIG. 2, for instance, such a module may be arranged to communicate over the S1-MME interface with the eNodeB 30. Although module 62 is shown separately from module(s) 60, these modules may be integrated and arranged to communicate over a common packet-switched network, as may be operated by a wireless service provider that provides the LTE service of network 12 and perhaps also the CDMA service of network 14.

Controller 64 may take a variety of forms, arranged to carry out various functions described herein. By way of example, as shown, controller 64 may comprise a processing unit 68 and data storage 70. The processing unit 68 may comprise one or more general purpose processors (e.g., INTEL microprocessors) and/or one or more special purpose processors (e.g., application specific integrated circuits or the like). And the data storage 70 may comprise one or more volatile and/or non-volatile storage components (non-transitory), such as magnetic, optical, or flash storage, and may be integrated in whole or in part with the processing unit 64. The data storage 70 may then hold program instructions 72, which may be executable by the processing unit 68 to carry out various functions described herein. Alternatively, the controller 64 could be provided as any combination of hardware, firmware, and/or software.

Figure 4:
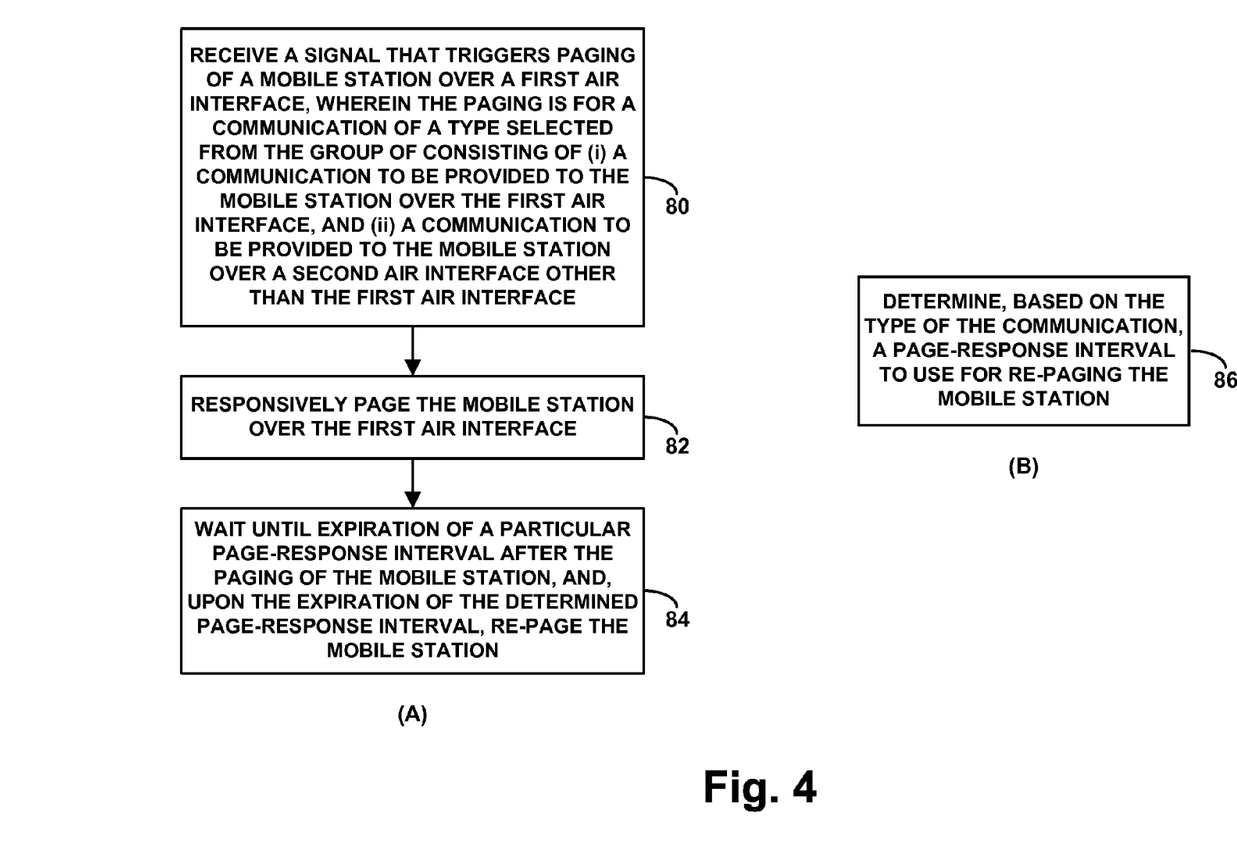
FIG. 4 is a flow chart depicting functions that can be carried out in accordance with an example method.

FIG. 4 is next a flow chart (parts A and B) depicting functions that can be carried out in accordance with an exemplary embodiment of the present method. The functions shown in these two separate flow charts may be carried out as separate processing threads by an apparatus such as paging controller 26.

As shown in part A of FIG. 4, at block 80, a network entity such as paging controller 26 may receive a signal that triggers paging of a mobile station over a first air interface, wherein the paging is for a communication of a type selected from the group of consisting of (i) a communication to be provided to the mobile station over the first air interface, and (ii) a communication to be provided to the mobile station over a second air interface other than the first air interface. At block 82, the network entity may then responsively page the mobile station over the first air interface. (For instance, a controller of the network entity may cause a network communication module of the entity to output a page message for transmission over the first air interface to the mobile station.) And at block 84, the network entity may wait until expiration of a particular page-response interval after the paging of the mobile station, and, upon the expiration of the determined page-response interval, may re-page the mobile station. (For instance, the controller may cause the network communication module to output the page message for transmission again over the first air interface to the mobile station.)

As shown in part B of FIG. 4, at block 86, the network entity may also determine, based on the type of the communication, a page-response interval to use for re-paging the mobile station. The network entity may make this determination when the network entity first receives the paging trigger signal, or after the first paging attempt or at some other point in the paging process.

In line with the discussion above, for instance, the paging trigger signal may come from a signal source that corresponds with the type of communication, and the network entity may then determine the page-response interval based on the type of communication by determining the page-response interval based on the signal source. In particular, the network entity may determine the signal source (such as based on the interface over which the network entity received the signal, and/or based on the communication module of the network entity that received the signal), and the network entity may then select the page-response interval based on the determined signal source.

Figure 5:
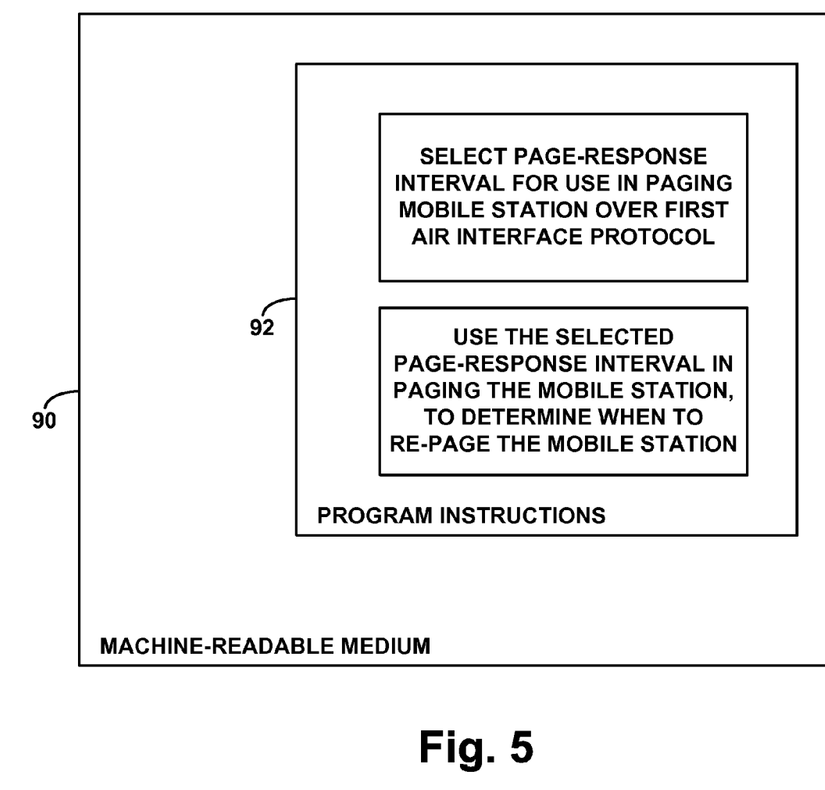
FIG. 5 is a depiction of a non-transitory computer readable medium having encoded thereon instructions executable to carry out the example method.

FIG. 5 is next a depiction of a non-transitory machine readable medium 90 having stored thereon instructions executable by a processing unit to carry out various functions described herein. This medium may take various forms, examples of which include, without limitation, a magnetic, optical, or flash storage device. The medium is shown having stored thereon (e.g., encoded thereon, stored in, or otherwise integrated with in a volatile and/or non-volatile manner) program instructions 92 executable by a processing unit such as that described above for instance, to carry out various functions.

As shown, the functions may include selecting a page-response interval for use in paging a mobile station over a first air interface protocol. In particular, the selecting function may include (i) selecting a first page-response time interval if the paging is for a communication to be provided to the mobile station over the first air interface protocol and (ii) selecting a second page-response time interval different than the first page-response time interval if the paging is for a communication to be provided to the mobile station over an air interface protocol other than the first air interface protocol. Further, the functions may then include using the selected page-response time interval in paging the mobile station, to determine when to re-page the mobile station. In practice, a processing unit executing these instructions may then apply the selected page-response time interval in paging the mobile station.

Exemplary embodiments have been described above. Those skilled in the art will understand, however, that changes and modifications may be made to these embodiments without departing from the true scope and spirit of the invention.

We claim:

1. A method comprising:
   receiving into a network entity a signal that triggers paging of a mobile station over a first air interface, wherein the paging is for a communication of a type selected from the group consisting of (i) a communication to be provided to the mobile station over the first air interface, and (ii) a communication to be provided to the mobile station over a second air interface other than the first air interface;
   responsive to receiving the signal, the network entity paging the mobile station over the first air interface;
   the network entity determining, based on the type of the communication, a page-response interval to use for re-paging the mobile station over the first air interface, wherein determining, based on the type of communication, the page-response interval to use for re-paging the mobile station over the first air interface comprises determining the page-response interval based on whether the paging over the first air interface is for a communication to be provided to the mobile station over the first air interface or is rather for a communication to be provided to the mobile station over the second air interface, wherein, if the paging over the first air interface is for a communication to be provided to the mobile station over the first air interface, then the network entity determines as the page-response interval a first page-response interval, but if the paging over the first air interface is for a communication to be provided to the mobile station over the second air interface, then the network entity determines as the page-response interval a second page-response interval different than the first page-response interval; and
   the network entity waiting until expiration of the determined page-response interval after the paging of the mobile station, and, upon the expiration of the determined page-response interval, re-paging the mobile station.

2. The method of claim 1, wherein the network entity is a paging controller, and paging and re-paging the mobile station over the first air interface each comprises transmitting from the paging controller to a base transceiver station a page message for the base transceiver station to wirelessly transmit over the first air interface to the mobile station.

3. The method of claim 1, wherein the network entity is a base transceiver station that radiates to provide the first air interface over which to page the mobile station.

4. The method of claim 1, wherein the determining occurs after the paging.

5. The method of claim 1, wherein the signal comes from a signal source corresponding with the type of communication, and wherein determining the page-response interval based on the type of communication comprises:
   determining the signal source; and
   selecting the page-response interval based on the determined signal source.

6. The method of claim 1, wherein the communication to be provided to the mobile station over the first air interface comprises data to be conveyed from a data gateway to the mobile station via the first air interface, and wherein the communication to be provided to the mobile station over the second air interface comprises a voice call to be connected to the mobile station over the second air interface.

7. The method of claim 6, wherein the first air interface is a Long Term Evolution (LTE) air interface, the data gateway is an LTE Serving-Gateway (SGW), the voice call is a circuit-switched voice call, and the second air interface is an air interface selected from the group consisting of a Code Division Multiple Access (CDMA) air interface and a Global System for Mobile Communications (GSM) air interface.

8. The method of claim 7, wherein the network entity is an LTE Mobility Management Entity (MME).

9. An apparatus comprising:
   at least one network communication module for receiving signals that trigger paging of mobile stations and for outputting page messages for transmission over a first air interface protocol to mobile stations; and
   a controller, wherein the controller is configured such that when the controller receives via the at least one network communication module a signal that triggers paging of a mobile station over the first air interface protocol,
   (i) the controller pages the mobile station by causing the at least one network communication module to output a page message for transmission over the first air interface protocol to the mobile station,
   (ii) the controller determines a page-response interval to wait after outputting the page message for transmission over the first air interface protocol to the mobile station, wherein the determining of the page-response interval to wait is based at least in part on whether the paging over the first air interface protocol is for a communication to be provided to the mobile station over the first air interface protocol or is rather for a communication to be provided to the mobile station over an air interface protocol other than the first air interface protocol, wherein if the paging over the first air interface protocol is for a communication to be provided to the mobile station over the first air interface protocol, then the controller determines as the page-response interval a first page-response interval, but if the paging over the first air interface protocol is for a communication to be provided to the mobile station over an air interface protocol other than the first air interface protocol, then the controller determines as the page-response interval a second page-response interval different than the first page-response interval,
   (iii) the controller then waits for expiration of the determined page-response interval, and
   (iv) upon expiration of the page-response interval without receiving a page response from the mobile station, the controller re-pages the mobile station by causing the at least one network communication module to output the page message again for transmission over the first air interface protocol to the mobile station.

10. The apparatus of claim 9,
    wherein the first air interface protocol is Long Term Evolution (LTE) and wherein the air interface protocol other than the first air interface protocol is a non-LTE protocol.

11. The apparatus of claim 10,
    wherein the communication to be provided to the mobile station over the first air interface protocol comprises data waiting at an LTE Serving-Gateway (SGW) to be transmitted to an eNodeB for transmission in turn over LTE to the mobile station, and wherein the communication to be provided to the mobile station over an air interface protocol other than the first air interface protocol comprises a circuit-switched-fallback communication.

12. The apparatus of claim 11, wherein the circuit-switched-fallback communication comprises a voice call to be connected to the mobile station over a second air interface protocol selected from the group consisting of Code Division Multiple Access (CDMA) and Global System for Mobile Communications (GSM).

13. The apparatus of claim 9,
wherein the at least one network communication module comprises a plurality of network communication modules, wherein one of the network communication modules receives the signal,
wherein which of the network communication modules receives the signal is indicative of whether the paging is for a communication to be provided to the mobile station over the first air interface protocol or rather a communication to be provided to the mobile station over an air interface protocol other than the first air interface protocol, and
wherein determining the page-response interval to wait based at least in part on whether the paging is for a communication to be provided to the mobile station over the first air interface protocol or rather a communication to be provided to the mobile station over an air interface protocol other than the first air interface protocol comprises determining the page-response interval to wait based on which one of the network communication modules receives the signal.

14. The apparatus of claim 9,
wherein the at least one network communication module receives from a first source signals to trigger paging for communications to be provided to mobile stations over the first air interface protocol, and the at least one network communication module receives from other than the first source signals to trigger for paging from communications to be provided to mobile stations over an air interface protocol other than the first air interface protocol, and
wherein determining the page-response interval to wait based at least in part on whether the paging is for a communication to be provided to the mobile station over the first air interface protocol or rather a communication to be provided to the mobile station over an air interface protocol other than the first air interface protocol comprises determining the page-response interval to wait based on whether the signal came from the first source or from other than the first source.

15. The apparatus of claim 9, wherein the apparatus is a Long Term Evolution (LTE) Mobility Management Entity (MME).

16. The apparatus of claim 9, wherein the apparatus is a base transceiver station that serves mobile stations over the first air interface protocol.

17. A non-transitory machine readable medium having stored thereon instructions executable by a processing unit to carry out functions comprising:
selecting a page-response time interval to use for paging a mobile station over a first air interface protocol, wherein the selecting comprises (i) selecting a first page-response time interval if the paging is for a communication to be provided to the mobile station over the first air interface protocol and (ii) selecting a second page-response time interval different than the first page-response time interval if the paging is for a communication to be provided to the mobile station over an air interface protocol other than the first air interface protocol; and
using the selected page-response time interval in paging the mobile station over the first air interface protocol, to determine when to re-page the mobile station over the first air interface protocol.

18. The non-transitory machine readable medium of claim 17, wherein the first air interface protocol is Long Term Evolution (LTE).

19. The non-transitory machine readable medium of claim 18, wherein the communication to be provided to the mobile station over an air interface protocol other than the first air interface protocol comprises a circuit-switched-fallback communication.

20. The non-transitory machine readable medium of claim 17, wherein the selecting is based on which of a plurality of network communication modules receives a trigger-message invoking the paging.

21. A paging control apparatus comprising:
at least one network communication module for receiving signals that trigger paging of mobile stations and for outputting page messages for wireless transmission to mobile stations; and
a controller, wherein the controller is configured such that when the controller receives via the at least one network communication module a signal that triggers paging of a mobile station, (i) the controller pages the mobile station by causing the at least one network communication module to output a page message for wireless transmission to the mobile station over a particular air interface, (ii) the controller then waits for expiration of a page-response interval, and (iii) upon expiration of the page-response interval without receiving a page response from the mobile station, the controller re-pages the mobile station by causing the at least one network communication module to output the page message again for wireless transmission to the mobile station over the particular air interface,
wherein the controller is further configured to select the page-response interval to wait, based at least in part on an interface over which the controller receives the signal, wherein if the controller receives the signal over a first interface, the controller selects a first page-response interval, and wherein if the controller receives the signal over a second interface different than the first interface, the controller selects a second page-response interval different than the first page-response interval, and
wherein waiting for expiration of the page-response interval comprises waiting for expiration of the selected page-response interval.

22. The paging control apparatus of claim 21, wherein the first interface is an S102 interface from an interworking server, wherein the second interface is an S11 interface from a serving gateway, and wherein the particular air interface is a Long Term Evolution (LTE) air interface.

23. The paging control apparatus of claim 22, wherein the first page-response interval is longer than the second page-response interval.

* * * * *